United States Patent
Sugiura et al.

(10) Patent No.: US 9,221,171 B2
(45) Date of Patent: Dec. 29, 2015

(54) PRESSURE AND ULTRASONIC SENSOR

(75) Inventors: Makiko Sugiura, Hekinan (JP);
Hirofumi Higuchi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 12 days.

(21) Appl. No.: 14/343,526

(22) PCT Filed: Aug. 28, 2012

(86) PCT No.: PCT/JP2012/005386
§ 371 (c)(1),
(2), (4) Date: Mar. 7, 2014

(87) PCT Pub. No.: WO2013/065219
PCT Pub. Date: May 10, 2013

(65) Prior Publication Data
US 2014/0214209 A1    Jul. 31, 2014

(30) Foreign Application Priority Data
Nov. 1, 2011    (JP) .................................. 2011-240522

(51) Int. Cl.
| | | |
|---|---|---|
| G01L 1/00 | (2006.01) |
| G01L 1/16 | (2006.01) |
| B25J 9/16 | (2006.01) |
| G01B 17/00 | (2006.01) |
| B06B 1/06 | (2006.01) |
| B25J 13/08 | (2006.01) |

(Continued)

(52) U.S. Cl.
CPC .............. *B25J 9/1612* (2013.01); *B06B 1/0674* (2013.01); *B25J 13/082* (2013.01); *G01B 17/00* (2013.01); *G01L 1/16* (2013.01); *G01L 1/162* (2013.01); *G01L 1/255* (2013.01); *G01L 5/226* (2013.01)

(58) Field of Classification Search
None
See application file for complete search history.

(56) References Cited

U.S. PATENT DOCUMENTS

| | | |
|---|---|---|
| 2003/0154793 A1 | 8/2003 | Omata |
| 2006/0186762 A1 | 8/2006 | Sugiura et al. |
| 2006/0196272 A1 | 9/2006 | Sugiura et al. |

(Continued)

FOREIGN PATENT DOCUMENTS

| | | |
|---|---|---|
| JP | 60-34293 A | 2/1985 |
| JP | 60-243582 A | 12/1985 |

(Continued)

OTHER PUBLICATIONS

International Search Report of the International Searching Authority mailed Nov. 27, 2012 for the corresponding international application No. PCT/JP2012/005386 (with English translation).

(Continued)

*Primary Examiner* — Lisa Caputo
*Assistant Examiner* — Brandi N Hopkins
(74) *Attorney, Agent, or Firm* — Posz Law Group, PLC

(57) ABSTRACT

A complex device includes: a substrate having a thick portion, a cavity and a membrane for bridging the cavity; and multiple piezoelectric elements having a lower electrode, a piezoelectric film and an upper electrode. A part of the piezoelectric elements has a projecting portion arranged on the upper electrode. The part of piezoelectric elements (30) provides a vertical pressure detection element. The piezoelectric elements further have an ultrasonic element other than the vertical pressure detection element. The ultrasonic element is arranged over at least the cavity of the substrate in a horizontal direction.

17 Claims, 8 Drawing Sheets

(51) Int. Cl.
*G01L 5/22* (2006.01)
*G01L 1/25* (2006.01)

(56) References Cited

U.S. PATENT DOCUMENTS

2009/0285664 A1  11/2009  Kim et al.
2012/0247217 A1* 10/2012  Suzuki ............................ 73/717

FOREIGN PATENT DOCUMENTS

| JP | 2003-284182 A | 10/2003 |
| JP | 2005-049303 A | 2/2005 |
| JP | 2008-008854 A | 1/2008 |
| JP | 2008-292168 A | 12/2008 |
| JP | 4403406 B2 | 1/2010 |
| JP | 2011-163945 A | 8/2011 |
| JP | 2012215533 A * | 11/2012 |

OTHER PUBLICATIONS

Written Opinion of the International Searching Authority mailed Nov. 27, 2012 for the corresponding international application No. PCT/JP2012/005386 (with English translation).

Distribution Measurement of Normal and Shear Forces by Using Tactile Sensor Array with Micro-cantilevers, Hirashima et al., pp. 132-135 from the Collected Papers 27th Sensor Symposium on Sensors, Micromachines and Applied Systems, 2010.

Highly Sensitive Micro Force Sensor Array with In-pixel Type CV Conversation Circuits, Ryo Kodama et al., pp. 161-166 from the Collected Papers 27th Sensor Symposium on Sensors, Micromachines and Applied Systems, 2010.

\* cited by examiner

PRESSURE AND ULTRASONIC SENSOR

CROSS REFERENCE TO RELATED APPLICATION

This present disclosure is a U.S. national stage application of PCT/JP2012/005386 filed on Aug. 28, 2012, and is based on Japanese Patent Application No. 2011-240522 filed on Nov. 1, 2011, the disclosures of which are incorporated herein by reference.

TECHNICAL FIELD

The present disclosure relates to a complex device and a robot hand drive control apparatus including the complex device.

BACKGROUND ART

As a grasp sensor used when a robot hand or the like grasps a grasp object, for example, a sensor including a distance sensor and a tactile sensor is known, as shown in Patent Literature No. 1.

Also, as the tactile sensor, a sensor of the form shown in Patent Literature No. 2 is known. The tactile sensor shown in Patent Literature No. 2 has, on a substrate, a stacked portion including a first layer and second layer disposed in the order from the substrate side, a raised portion formed by bending the first layer and second layer toward the second layer side, and a detection device for detecting a deformation of the raised portion. The stacked portion and raised portion each include a plurality of layers different in lattice constant from each other, and the first layer and second layer are bent by a force generated by a difference in lattice constant in the plurality of layers. Also, the stacked portion and raised portion are covered with a membrane, and a configuration is such that the raised portion deforms when a force is applied to the membrane. As the detection device, it is possible to employ an element which detects a deformation of the raised portion based on the piezoresistive effect and a change in capacitance between electrodes.

In Patent Literature No. 1, as the distance sensor, a vision sensor which detects a distance to the grasp object, or the like, by imaging is employed, and the vision sensor is connected to a base portion of the robot hand. Meanwhile, the tactile sensor is provided at a fingertip of the robot hand, and a configuration is such that it is thereby possible to detect a force applied to the fingertip. That is, the distance sensor and tactile sensor are separately provided.

Also, when using the tactile sensor shown in Patent Literature No. 2 too, the tactile sensor has a structure wherein it stands upright with respect to the substrate, meaning that it is difficult to integrate the tactile sensor with the distance sensor. That is, the distance sensor and tactile sensor are separately provided.

In this way, with the heretofore known grasp sensors, as it is necessary to provide the distance sensor and tactile sensor separately, thus increasing the number of parts, it is difficult to reduce the physical size.

PRIOR ART LITERATURES

Patent Literature

[Patent Literature No. 1] JP-A-2004-294001
[Patent Literature No. 1] Japanese Patent No. 4,403,406

SUMMARY OF INVENTION

It is an object of the present disclosure to provide a grasp sensor and robot hand drive control apparatus wherein it is possible to reduce the number of parts.

According to a first aspect of the present disclosure, a complex device includes: a substrate having a thick portion, a cavity surrounded by the thick portion and a membrane arranged over the thick portion so as to bridge the cavity; and a plurality of piezoelectric elements, each of which is formed by stacking a lower electrode, a piezoelectric film and an upper electrode in this order on one surface of the membrane opposite to the thick portion. The piezoelectric elements are electrically separated from each other. A part of the piezoelectric elements has a projecting portion made of an electrical insulating material. The projecting portion is arranged on the upper electrode. The part of piezoelectric elements provides a vertical pressure detection element for detecting a vertical pressure applied in a vertical direction, in which the piezoelectric elements are stacked. The piezoelectric elements further have an ultrasonic element, which implements at least one of ultrasonic transmission or ultrasonic reception. The ultrasonic element is one of the piezoelectric elements other than the vertical pressure detection element. The ultrasonic element is arranged over at least the cavity of the substrate in a horizontal direction perpendicular to the vertical direction.

In the heretofore described complex device, a plurality of piezoelectric elements are formed on the membrane, and a part of the piezoelectric elements is caused to function as the vertical pressure detection element, while at least a part of the piezoelectric elements other than the vertical pressure detection element is caused to function as the ultrasound element. Consequently, while the ultrasound element acting as a distance sensor and the vertical pressure detection element acting as a tactile sensor are included as the grasp sensor, it is possible to reduce the number of parts. Also, by reducing the number of parts, it is possible to reduce the physical size and reduce manufacturing costs.

According to a second aspect of the present disclosure, a robot hand drive control apparatus includes: the complex device according to the first aspect of the present disclosure having the ultrasonic transmission element and the plurality of ultrasonic reception elements; a distance calculation device, which calculates a distance to a grasp object to be grasped by a robot hand based on time information defined from transmission of the ultrasonic wave by the ultrasonic transmission element to reception of a reflected wave of the ultrasonic wave by the ultrasonic reception elements; a hardness calculation device, which calculates a hardness of the grasp object based on the time information and amplitude information indicating an amplitude of the reflected waves received by the ultrasonic elements; a real picture calculation device, which calculates a position and a size of the grasp object based on phase difference information indicating a phase difference between the reflected waves received by the plurality of ultrasonic elements; a grasp control device, which controls a drive of the robot hand for grasping the grasp object according to the distance calculated in the distance calculation device, the hardness calculated in the hardness calculation device, and the position and the size calculated in the real picture calculation device; a vertical pressure calculation device, which calculates a vertical pressure at time when the drive control by the grasp control device is completed, based on a detection signal of the vertical pressure detection element; a grasp correction device, which feedback-controls a grasp condition of the grasp object grasped by the robot hand according to the vertical pressure calculated in the vertical pressure calculation device.

In the heretofore described robot hand drive control apparatus, it is possible to calculate not only the distance to the grasp object but also the hardness of the grasp object. Because of this, it is possible to grip the grasp object at a pressure and speed in accordance with the calculated hardness. Also, as it is also possible to calculate the position and size of the grasp object, it is possible to grip the grasp object with good accuracy. Also, it is possible to calculate a vertical pressure, and based on the calculated vertical pressure, correct (feedback control) the grasp condition of the grasp object grasped by the robot hand.

According to a third aspect of the present disclosure, a robot hand drive control apparatus includes: the complex device according to the first aspect of the present disclosure having the ultrasonic transmission element and the plurality of ultrasonic reception elements, wherein the one of the piezoelectric element is arranged adjacent to the vertical pressure detection element in the horizontal direction, the vertical pressure detection element and the one of the piezoelectric elements adjacent to each other provide the shear force detection element, and the shear force detection element detects a shear force applied in the horizontal direction as a change in capacitance value using at least the upper electrode; a distance calculation device, which calculates a distance to a grasp object grasped by a robot hand based on time information defined from transmission of the ultrasonic wave by the ultrasonic transmission element to reception of a reflected wave of the ultrasonic wave by the ultrasonic reception element; a hardness calculation device, which calculates a hardness of the grasp object based on the time information and amplitude information indicating an amplitude of the reflected waves received by the ultrasonic reception elements; a real picture calculation device, which calculates a position and a size of the grasp object based on phase difference information indicating a phase difference between the reflected waves received by the plurality of ultrasonic reception elements; a grasp control device, which controls a drive of the robot hand for grasping the grasp object according to the distance calculated in the distance calculation device, the hardness calculated in the hardness calculation device, and the position and the size calculated in the real picture calculation device; a vertical pressure calculation device, which calculates a vertical pressure at time when the drive control by the grasp control device is completed, based on a detection signal of the vertical pressure detection element; a shear force calculation device, which calculates a shear force applied in the horizontal direction at time when the drive control by the grasp control device is completed, based on a capacitance value detected by the shear force detection element; and a grasp correction device, which feedback-controls a grasp condition of the grasp object grasped by the robot hand according to the vertical pressure calculated in the vertical pressure calculation device and the shear force calculated in the shear force calculation device.

In the heretofore described robot hand drive control apparatus, it is possible to calculate not only the distance to the grasp object but also the hardness of the grasp object. Because of this, it is possible to grip the grasp object at a pressure and speed in accordance with the calculated hardness. Also, as it is also possible to calculate the position and size of the grasp object, it is possible to grip the grasp object with good accuracy. Also, it is possible to calculate a vertical pressure, and based on the calculated vertical pressure, correct (feedback control) the grasp condition of the grasp object grasped by the robot hand. Furthermore, it is possible to calculate a shear force. Because of this, it is possible, based on the heretofore described vertical pressure and shear force, to correct (feedback control) the grasp condition of the grasp object by the robot hand with better accuracy.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
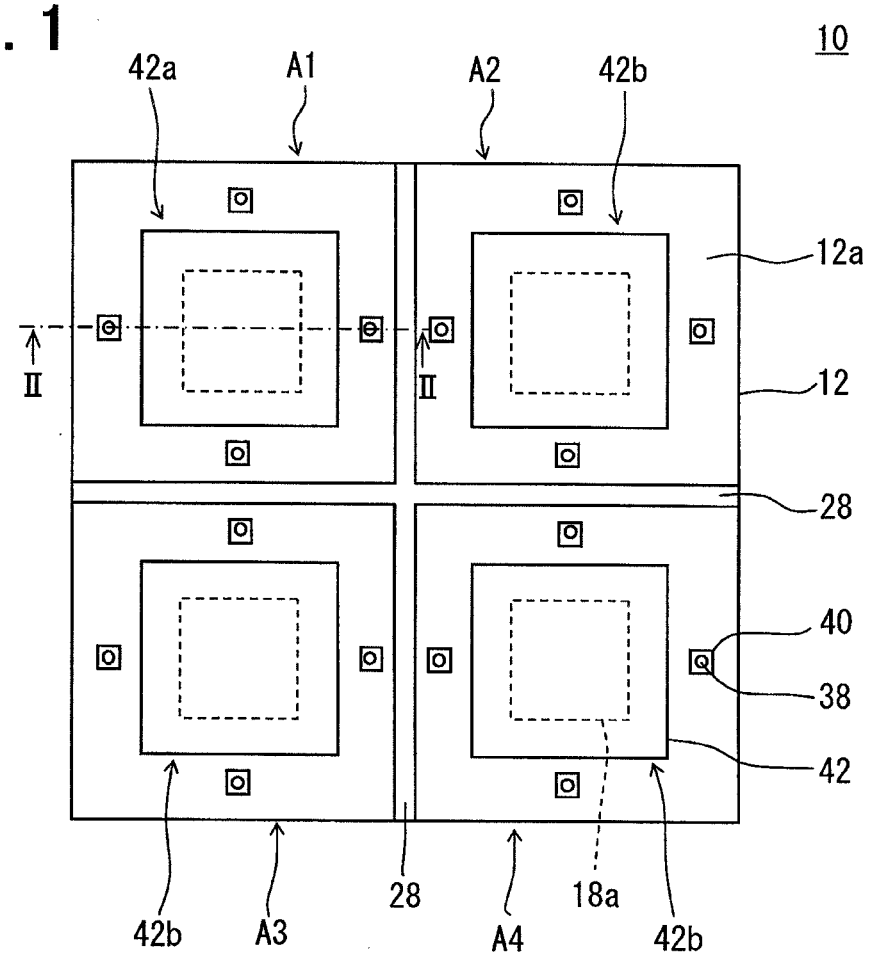
FIG. 1 is a plan view showing an outline configuration of a grasp sensor according to a first embodiment.

Hereafter, a description will be given, referring to the drawings, of embodiments. In each embodiment shown hereafter, the same or related elements will be given the same signs. In the following, a direction in which are stacked a lower electrode 32, piezoelectric film 34, and upper electrode 36 which configure a piezoelectric element 30 is defined as a vertical direction, and a direction perpendicular to the vertical direction is defined as a horizontal direction.

First Embodiment

Firstly, a description will be given of a complex device. Herein, the complex device is used when gripping and pushing an object. Furthermore, the complex device includes a grasp sensor used when grasping an object.

Herein, firstly, a description will be given of a grasp sensor. A grasp sensor 10 shown in FIGS. 1 and 2 is characterized mainly in that a piezoelectric element 30 is formed on a substrate 12, and that the piezoelectric element 30 has vertical pressure detection elements 40 and ultrasonic elements 42.

The substrate 12 has a thick portion 14, a cavity 16 surrounded by the thick portion in the horizontal direction, and a membrane 18 formed on the thick portion 14 so as to bridge the cavity 16. Further, a portion of the membrane 18 bridging the cavity 16 is made a thin-walled portion 18a thinner than a portion of the substrate 12 in which the thick portion 14 is formed, and the thin-walled portion 18a is provided so as to be deformable.

Figure 2:
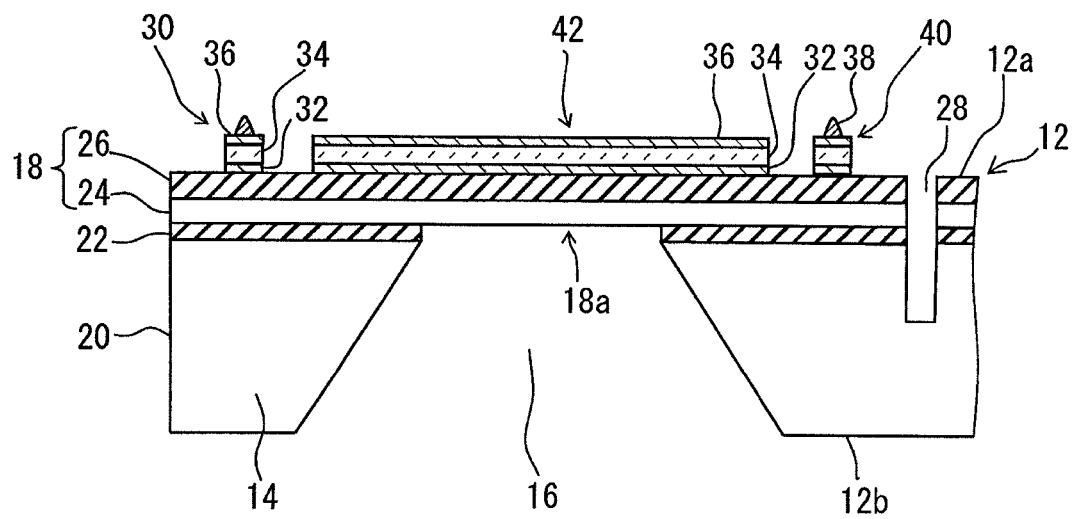
FIG. 2 is a sectional view along the line II-II of FIG. 1.

In this embodiment, the substrate 12 is configured of an SOI (Silicon On Insulator) substrate, wherein a semiconductor layer 24 formed from monocrystalline silicon is disposed on a support substrate 20 formed from monocrystalline silicon via an insulating film 22 of oxide silicon, or the like, and an insulating film 26 of oxide silicon, or the like, formed on a surface of the semiconductor layer 24 opposite to the insulating film 22, as shown in FIG. 2. When the insulating film 26 side surface of the substrate 12 is taken to be one surface 12a, and the support substrate 20 side surface of the substrate 12 opposite to the one surface 12a is taken to be a rear surface 12b, the cavity 16, with the semiconductor layer 24 as its bottom portion, passes through the support substrate 20 and insulating film 22, and opens to the rear surface 12b of the substrate 12. This kind of cavity 16 can be formed by etching the substrate 12 from the rear surface 12b side using a well-known method. The semiconductor layer 24 and insulating film 26 of the substrate 12 form the membrane 18, thus bridging the cavity 16. Consequently, a portion of the support substrate 20 and insulating film 22 enclosing the cavity 16 in the horizontal direction forms the thick portion 14. Also, the portion of the substrate 12 in which the thick portion 14 is formed refers to a portion formed of the thick portion 14 and the membrane 18 positioned on the thick portion 14.

Also, in this embodiment, a trench 28 is formed in the substrate 12 to a depth reaching halfway into the support substrate 20 from the one surface 12a. The trench 28 is provided in a cross shape in plan view so as to section the substrate 12 (chip) which is substantially square in plan view into four regions A1 to A4 having substantially equal areas in the horizontal direction. Mutual vibration transmission between the regions A1 to A4 is suppressed by the trench 28. Each of the regions A1 to A4 sectioned by the trench 28 has the heretofore described structure of the substrate 12. That is, the cavity 16 is formed in each region A1 to A4, and a portion of the membrane 18 bridging the cavity 16 forms the thin-walled portion 18a. FIG. 1 shows the thin-walled portion 18a of each region A1 to A4 as the region surrounded by the dashed line.

The piezoelectric element 30 is formed with the lower electrode 32, piezoelectric film 34, and upper electrode 36 stacked in this order on the one surface 12a of the substrate 12. According to this kind of piezoelectric element 30, it is possible to detect an applied external force as a voltage generated between the electrodes 32 and 36 by the piezoelectric effect of the piezoelectric film 34. Meanwhile, it is possible, when a voltage is applied between the electrodes 32 and 36, to deform the piezoelectric film 34 itself by the inverse piezoelectric effect of the piezoelectric film 34.

In this embodiment, a film formed from, for example, lead zirconate titanate (PZT) is employed as the piezoelectric film 34. As the electrodes 32 and 36 sandwiching the piezoelectric film 34, it is possible to employ an electrode formed by sputtering or plating Pt or Cu, baking conductive paste, or the like.

A plurality of the piezoelectric elements 30 are formed, electrically separated from each other, on the same substrate 12. One portion of the plurality of piezoelectric elements 30 are formed on the thin-walled portion 18a of the membrane 18, and one portion of the plurality of piezoelectric elements 30 are formed on the thick portion 14 via the membrane 18.

Further, the plurality of piezoelectric elements 30 electrically separated from each other have the vertical pressure detection elements 40 and ultrasonic elements 42. Also, the electrodes 32 and 36 of the plurality of piezoelectric elements 30 are electrically connected to an unshown pad (external connection electrode) formed on the one surface 12a of the substrate 12. In order to electrically connecting the electrodes 32 and 36 and pad, an unshown wiring formed on the one surface 12a of the substrate 12 may be used. Also, an unshown contact hole formed in the insulating film 26 and an unshown diffusion layer formed as a surface layer of the semiconductor layer 24 may be used. Also, an inner layer wiring provided in the insulating film 26 may be used when the insulating film 26 is a multilayer film. Furthermore, the electrodes 32 and 36 may be electrically connected to a pad formed on the rear surface 12b of the substrate 12 by an unshown through electrode.

Each of the vertical pressure detection elements 40 has a projecting portion 38 formed from an electrical insulating material, such as resin or rubber, on the upper electrode 36 of the piezoelectric element 30 in order to detect a vertical pressure (also referred to as a contact pressure) applied to the grasp sensor 10 in the vertical direction. Because of this, a grasp object makes contact with the projecting portions 38 of the vertical pressure detection elements 40, of the piezoelectric elements. Because of this, the vertical pressure detection elements 40 can detect a vertical pressure by the piezoelectric effect of the piezoelectric film 34 as a voltage generated between the electrodes 32 and 36.

In this embodiment, the vertical pressure detection elements 40 are not provided on the thin-walled portion 18a of the membrane 18, but are provided on the thick portion 14 of the substrate 12 via the membrane 18. Also, the vertical pressure detection elements 40 are provided in each region A1 to A4, and as shown in FIG. 1, in each region A1 to A4, the vertical pressure detection elements 40 are provided corresponding to four sides of the rectangle so as to enclose the thin-walled portion 18a of a rectangular shape in plan view. That is, four vertical pressure detection elements 40 are provided in each region A1 to A4, and the vertical pressure detection elements 40 are electrically separated from each other.

The ultrasonic element 42, being used for at least one of ultrasonic transmission or ultrasonic reception (reception of the reflected waves of transmitted ultrasonic), is provided on at least the cavity 16 of the substrate 12 in the horizontal direction. That is, the ultrasonic element 42 is provided on the thin-walled portion 18a of the membrane 18. Because of this, when a drive signal is applied to the electrodes 32 and 36, the piezoelectric film 34 itself deforms by the inverse piezoelectric effect of the piezoelectric film 34, thereby causing the thin-walled portion 18a of the membrane 18 to vibrate in the vertical direction, and the transmitting ultrasonic element 42 can transmit ultrasonic to the exterior. Meanwhile, when the thin-walled portion 18a of the membrane 18 vibrates in the vertical direction upon receiving ultrasonic, a distortion occurs in the piezoelectric film 34, and the receiving ultrasonic element 42 can detect ultrasonic as a voltage generated between the electrodes 32 and 36, that is, receive ultrasonic, by the piezoelectric effect of the piezoelectric film 34.

In this embodiment, the ultrasonic element 42 is formed on the thin-walled portion 18a of the membrane 18 in each region A1 to A4. More specifically, the ultrasonic element 42 is formed having a rectangular shape corresponding to the thin-walled portion 18a so as to cover the whole area of the thin-walled portion 18a of a rectangular shape in plan view, as shown in FIG. 1. In each region A1 to A4, a predetermined space is provided between the ultrasonic element 42 and vertical pressure detection elements 40. Also, four ultrasonic elements 42 are electrically separated from each other, and only the ultrasonic element 42 in the region A1 is a transmitting and receiving element 42a capable of transmission and reception, while the remaining ultrasonic elements 42 in the regions A2 to A4 are receiving elements 42b exclusively for reception. That is, the same substrate 12 has thereon one ultrasonic element 42 (42a) which can transmit ultrasonic and four ultrasonic elements 42 (42a and 42b) which can receive ultrasonic. By having a plurality of ultrasonic elements 42 which can receive ultrasonic in this way, it is possible to detect not only the distance to and hardness of the grasp object but a real picture of the grasp object, such as the position and size of the grasp object.

Next, a description will be given of a configuration of a robot hand drive control apparatus including the heretofore described grasp sensor 10.

Figure 3:
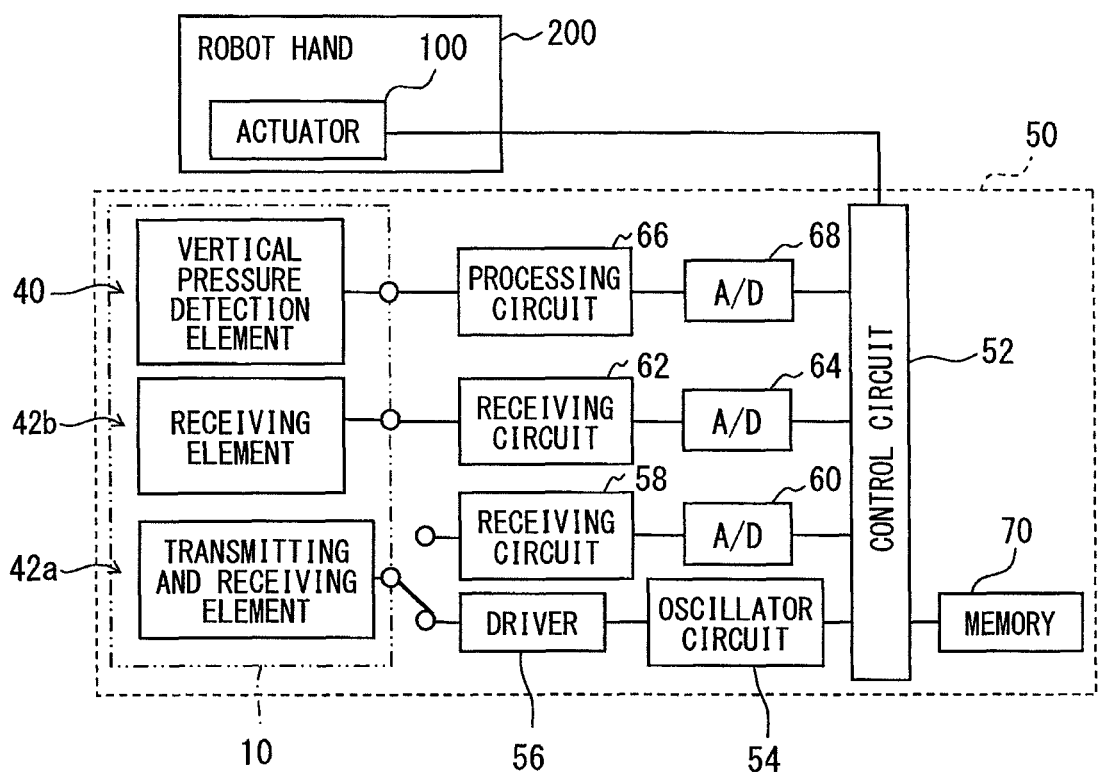
FIG. 3 is a block diagram showing an outline configuration of a robot hand drive control apparatus including the grasp sensor shown in FIG. 1.

As shown in FIG. 3, a robot hand drive control apparatus 50 includes, apart from the heretofore described grasp sensor 10, a control circuit 52, an oscillator circuit 54, a driver 56, receiving circuits 58 and 62, A/D converter circuits 60, 64, and 68, a processing circuit 66, and a memory 70.

The control circuit 52 includes an unshown central processing unit (CPU), an unshown read-only memory (ROM) in which are stored various programs which the CPU executes, an unshown random access memory (RAM) used as a work area for each kind of computation which the CPU executes in accordance with each program stored in the ROM, and the like. Further, the control circuit 52 has the function of instructing the oscillator circuit 54 to generate a drive signal which drives the ultrasonic element 42a, the function of switching between transmission and reception of the transmitting and receiving element 42a, the function of calculating the presence or absence, distance, hardness, position, and shape of the grasp object, the function of controlling the drive of an actuator 100 which moves a robot hand 200 using the calculated distance, hardness, position, and shape, the function of calculating a vertical pressure, the function of correcting (feedback controlling) the drive of the actuator 100 based on the calculated vertical pressure, and the like.

The oscillator circuit 54, upon receiving an instruction signal from the control circuit 52, outputs a drive signal of a predetermined frequency. The driver 56 is a drive circuit which drives the transmitting and receiving element 42a based on the drive signal from the oscillator circuit 54, and ultrasonic of a predetermined frequency is transmitted from the transmitting and receiving element 42a by the driver 56. In this embodiment, the driver 56 includes a power amplifier circuit such as a transformer.

The receiving circuits 58 and 62 include an amplifier which amplifies signals received from the corresponding ultrasonic elements 42a and 42b, a filter which carries out filtering on the amplified received signals, and the like. Further, the signals processed by the receiving circuits 58 and 62 are input into the control circuit 52 through the A/D converter circuits 60 and 64. FIG. 3 shows, for the sake of simplicity, only one receiving element 42b and one receiving circuit 62 and A/D converter circuit 64 which process the signals received from the one receiving element 42b. As heretofore described, however, the grasp sensor 10 has three receiving elements 42b, and the robot hand drive control apparatus 50 has three receiving elements 42b and the receiving circuits 62 and A/D converter circuits 64 corresponding to the receiving elements 42b.

The processing circuit 66 also includes, in the same way as the receiving circuits 58 and 62, an amplifier which amplifies an output signal of the corresponding vertical pressure detection element 40, a filter which carries out filtering on the amplified signal, and the like. Further, the signal processed by the processing circuit 66 is input into the control circuit 52 through the A/D converter circuit 68. FIG. 3 shows, for the sake of simplicity, only one vertical pressure detection element 40 and one processing circuit 66 and A/D converter circuit 68. As heretofore described, however, the grasp sensor 10 has four vertical pressure detection elements 40 in each region A1 to A4, that is, a total of 16 vertical pressure detection elements 40, and the robot hand drive control apparatus 50 has 16 vertical pressure detection elements 40 and the processing circuits 66 and A/D converter circuits 68 corresponding to the vertical pressure detection elements 40.

The memory 70 is a rewritable nonvolatile memory, in which are stored parameters for controlling the drive of the actuator 100 which moves the robot hand 200. Specifically, parameters which cannot be detected by the grasp sensor 10, for example, information indicating the weight of the grasp object and information indicating the friction coefficient of the grasp object, are stored. Also, a map indicating the correspondence relationship between the distance and amplitude when calculating the hardness, a map indicating the relationship between the hardness, grasp object weight, and friction coefficient and the vertical pressure, and the like, are stored.

Next, a description will be given, using FIG. 4, of an operation wherein the robot hand 200 grips the grasp object, which the control circuit 52 executes in accordance with a predetermined program.

Firstly, when the robot hand drive control apparatus 50 is powered on, the control circuit 52 outputs a signal instructing the oscillator circuit 54 to output a drive signal. The oscillator circuit 54, upon receiving the instruction from the control circuit 52, outputs a drive signal of a predetermined frequency (step S10).

The generated drive signal (voltage signal) is transmitted to the transmitting and receiving element 42a via the driver 56. By so doing, the transmitting and receiving element 42a vibrates in the vertical direction, and the vibration is transmitted to the thin-walled portion 18a of the membrane 18, and transmitted to the exterior as ultrasonic. The frequency of the ultrasonic coincides with the frequency of the drive signal.

When a predetermined time elapses after the start of the transmission processing, the control circuit 52 switches so that the transmitting and receiving element 42a is connected to the receiving circuit 58. Further, the control circuit 52 determines whether or not the amplitude of the received signal of the elements 42a and 42b which can receive the ultrasonic obtained through the receiving circuits 58 and 62 and A/D converter circuits 60 and 64 is larger than a predetermined threshold value, that is, whether or not there is any ultrasonic element 42a, 42b which has received reflected waves from the grasp object (step S11).

In the step S11, when it is determined that there is no ultrasonic element 42a, 42b which has received the reflected waves, the control circuit 52 determines whether or not a corresponding measurement time has elapsed (step S12). Further, when the measurement time has not elapsed, the operation returns to the step S11. Meanwhile, when it is determined that the measurement time has been exceeded, the operation returns to the step S10. The measurement time is a time from a timing at which the reflected waves from the grasp object can be detected (a detectability start timing) until the detectability finishes, and in this embodiment, is set in advance.

When it is determined in the step S11 that there is the ultrasonic element 42a, 42b which has received the reflected waves, the control circuit 52 calculates a distance to the grasp object grasped by the robot hand 200, based on time information needed from ultrasonic being transmitted from the transmitting and receiving element 42*a* until the reflected waves of the ultrasonic are received by one of the ultrasonic elements 42*a* and 42*b* (step S13). The step S13 corresponds to distance calculation device according to the claims. In the following, it is taken that all the ultrasonic elements 42*a* and 42*b* have received the reflected waves.

Next, the control circuit 52 calculates the hardness (expected hardness) of the grasp object based on the heretofore described time information and amplitude information indicating the amplitude of the reflected waves received by the ultrasonic elements 42*a* and 42*b* (step S14). The step S14 corresponds to hardness calculation device according to the claims. The harder the object, the larger the amount of ultrasonic reflected, and the amplitude of the received signal increases. Meanwhile, the softer the object, the amount of ultrasonic reflected, and the amplitude of the received signal decreases. Also, the amplitude of the received signal also depends on the distance to the object. Consequently, the control circuit 52 can calculate the hardness (expected hardness) of the grasp object from the time information, that is, the distance and amplitude, using the maps stored in the memory 70.

Also, when it is determined in the step S11 that there are a plurality of ultrasonic elements 42*a* and 42*b* which have received the reflected waves, the control circuit 52 calculates the position and size of the grasp object, that is, the real picture of the grasp object, based on phase difference information indicating a phase difference between the reflected waves received by the plurality of ultrasonic elements 42*a* and 42*b* (step S15). The step S15 corresponds to real picture calculation device according to the claims. Upon detecting and plotting the phase difference between the ultrasonic elements 42*a* and 42*b*, not only the position of the grasp object but also the size thereof can be ascertained. Because of this, the larger the number of ultrasonic elements 42*a* and 42*b* which can receive ultrasonic, the more desirable, in order to calculate the size.

Further, the control circuit 52, using the distance calculated in the step S13, the hardness calculated in the step S14, and the position and size calculated in the step S15, controls the drive of the actuator 100, such as a motor, so that the robot hand 200 grasps the grasp object (step S16). The step S16 corresponds to grasp control device according to the claims. In this embodiment, as the calculated hardness information is used, it is possible to set a speed and pressure at which to grip the grasp object in accordance with the hardness. In this embodiment, the control circuit 52 retrieves the information of the weight and friction coefficient of the grasp object stored in the memory 70, and also uses these items of information for controlling the drive of the actuator 100. This enables a highly accurate operation of the robot hand 200 in accordance with the grasp object.

Next, the control circuit 52 determines whether or not the grasp operation of the robot hand 200 has been completed (step S17). The determination is made by whether or not the actuator 100 has completed a predetermined operation on which the actuator 100 has been instructed in the step S16. For example, when a servomotor is used as the actuator 100, the servomotor includes an encoder which detects a rotation angle, meaning that it is possible to detect from an output of the encoder whether or not the motor has reached a predetermined position, that is, whether or not the grasp operation of the robot hand 200 has been completed.

When it is determined in the step S17 that the grasp operation has been completed, the control circuit 52 calculates a vertical pressure based on a detection signal of the vertical pressure detection element 40 (step S18). The step S18 corresponds to vertical pressure calculation device according to the claims.

Further, the control circuit 52, based on whether or not the vertical pressure calculated in the step S18 has exceeded a predetermined threshold value, determines whether or not the robot hand 200 is in contact with the grasp object (step S19). When it is determined in the step S19 that there is no contact, the operation returns to the step S10.

Meanwhile, when it is determined in the step S19 that there is a contact, the control circuit 52, using the vertical pressure calculated in the step S18, feedback controls the grasp condition of the grasp object grasped by the robot hand 200 (step S20). The step S20 corresponds to grasp correction device according to the claims. For example, when the vertical pressure calculated in the step S18 is different from a recommended vertical pressure stored in the memory 70, the control circuit 52 feedback controls the actuator 100 so that the vertical pressure reaches the recommended vertical pressure. That is, the control circuit 52 adjusts the grasp force of the robot hand 200 which grips the grasp object. The recommended vertical pressure is such that the correspondence relationship thereof with the hardness, grasp object weight, and friction coefficient is stored in the memory 70 as a map.

The above is the operation wherein the grasp object is gripped by the robot hand 200. After the operation has been completed, for example, the operation of transferring the grasp object to a predetermined position and disposing it in position is executed in accordance with another unshown flow.

Next, a description will be given of advantageous effects of characteristic portions of the grasp sensor 10 and robot hand drive control apparatus 50 according to this embodiment.

In this embodiment, a plurality of piezoelectric elements 30 are formed on the membrane 18, and one portion of the piezoelectric elements 30 are caused to function as the vertical pressure detection elements 40, while at least one portion of the piezoelectric elements 30 except the vertical pressure detection elements 40 are caused to function as the ultrasonic elements 42. Consequently, although the grasp sensor 10 includes the ultrasonic elements 42 as a distance sensor and the vertical pressure detection elements 40 as a tactile sensor, it is possible to reduce the number of parts. Also, it is possible, owning to a reduction in the number of parts, to reduce the physical size and manufacturing costs.

In particular, in this embodiment, the vertical pressure detection element 40 is provided on the thick portion 14 via the membrane 18 in the horizontal direction. As the thick portion 14 has higher rigidity than the other portions of the substrate 12, for example, the thin-walled portion 18*a* of the membrane 18 positioned on each cavity 16, it is possible to detect the vertical pressure with good accuracy.

Also, in this embodiment, the substrate 12 has a plurality of cavities 16, and the ultrasonic elements 42 formed so as to cover their respective thin-walled portions 18*a* on the respective cavities 16 are electrically separated from each other. Also, as the plurality of ultrasonic elements 42, the transmitting and receiving element 42*a* which transmits ultrasonic and the plurality of ultrasonic elements 42*a* and 42*b* which receive the ultrasonic are integrated on the same substrate 12. Because of this, it is possible, with one grasp sensor 10, to ascertain not only the distance to and hardness of the grasp object but the real picture (the size and position) of the grasp object. That is, it is possible to control the operation of the robot hand 200 with high accuracy in accordance with the grasp object.

Also, in this embodiment, the piezoelectric element 30 has a plurality of vertical pressure detection elements 40, and the plurality of vertical pressure detection elements 40 are provided dispersed in the horizontal direction. Because of this, it is possible to detect a vertical pressure regardless of the shape and size of the grasp object.

Also, in this embodiment, it is possible to calculate not only the distance to the grasp object but the hardness of the grasp object with the ultrasonic elements 42a and 42b included in the grasp sensor 10. Because of this, it is possible to grasp the grasp object at a pressure and speed corresponding to the calculated hardness even though the hardness of the grasp object is not clear. Also, as it is also possible to calculate the position and size of the grasp object, it is possible to grasp the grasp object with good accuracy. Furthermore, a vertical pressure can be calculated by the vertical pressure detection elements 40. Because of this, it is possible to correct (feedback control) the operation of the robot hand 200, based on the calculated vertical pressure, after gripping the grasp object.

Modification Example

The heretofore described embodiment has shown an example of the cavities 16 formed from the rear surface 12B side of the substrate 12. However, the cavities 16 may be formed from the one surface 12a side of the substrate 12.

The disposition of the piezoelectric elements 30 (the disposition of the vertical pressure detection elements 40 and ultrasonic elements 42) in the grasp sensor 10 is not limited to the heretofore described example. For example, the heretofore described embodiment has shown an example wherein the grasp sensor 10 has one transmitting and receiving element 42a and three receiving elements 42b as the ultrasonic elements 42. However, the grasp sensor 10 has only to have at least one ultrasonic element 42 used for at least one of ultrasonic transmission or ultrasonic reception. For example, a configuration may be adopted wherein the grasp sensor 10 has one ultrasonic element 42 used for only ultrasonic transmission and a plurality of receiving elements 42b. Also, the number of vertical pressure detection elements 40 formed on one substrate 12 is not particularly limited either.

Figure 5:
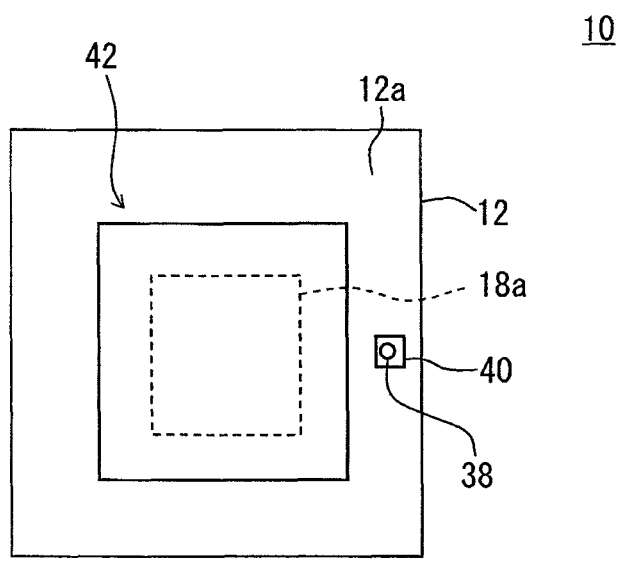
FIG. 5 is a plan view showing a modification example of the grasp sensor.

In the example shown in FIG. 5, the grasp sensor 10 has only one cavity 16 (not shown) in the substrate 12, and one ultrasonic element 42 is formed so as to cover the thin-walled portion 18a of the membrane 18 on the cavity 16. Also, one vertical pressure detection element 40 is formed on the substrate 12. In the case of the configuration wherein the grasp sensor 10 has one ultrasonic element 42 in this way, the robot hand drive control apparatus 50 has only to include a plurality of grasp sensors 10 (a plurality of chips) in order to calculate the real picture (position and size) of the grasp object from the phase difference.

Figure 6:
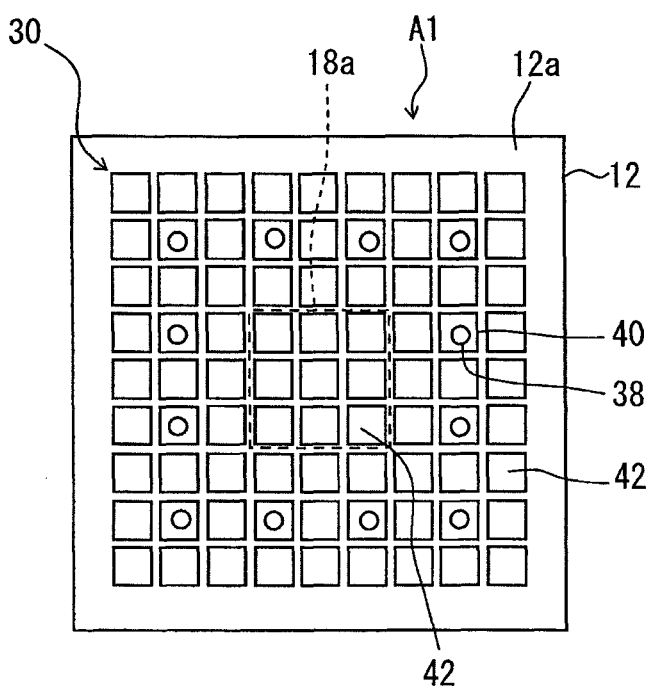
FIG. 6 is a plan view showing a modification example of the grasp sensor.

Meanwhile, in the example shown in FIG. 6, the piezoelectric elements 30 are provided in a matrix pattern (in rows and columns) substantially all over the one surface 12a of the substrate 12 in the region A1. Specifically, the piezoelectric elements 30 are disposed in nine rows by nine columns, and each piezoelectric element 30 forms a substantially square shape in the horizontal direction. Further, one portion of the piezoelectric elements 30 positioned above the thick portion 14, specifically, every other piezoelectric element 30 on the second circumference with the outermost circumference as the first circumference is the vertical pressure detection element 40. Also, the other piezoelectric elements 30 are the ultrasonic elements 42. These plurality of ultrasonic elements 42 are controlled in the robot hand drive control apparatus 50 so that the lower electrodes 32 are equal in potential to each other, while the upper electrodes 36 are equal in potential to each other. That is, the plurality of ultrasonic elements 42, although being structurally divided, electrically behave as one ultrasonic element. The same configuration is adopted in the other regions A2 to A4. The configuration shown in FIG. 6 can also be applied to the configuration wherein the substrate 12 has only one cavity 16, as shown in FIG. 5.

The heretofore described embodiment has shown an example wherein data relating to the weight and friction coefficient of the grasp object are stored in the memory 70. However, a configuration may be adopted wherein the robot hand drive control apparatus 50 includes a load sensor and a sensor which detects a surface condition (a friction coefficient) as sensors other than the grasp sensor 10, and based on signals from these sensors, calculates the weight and surface condition (friction coefficient) of the grasp object.

In the heretofore described embodiment, the trench 28 is made empty, but a configuration is adopted wherein the inside of the trench 28 is filled with a vibration damping member. As this kind of vibration damping member, a material with a large damping constant, preferably, a material with a low degree of elasticity and density is suitable. It is possible to use, for example, a rubber based material or a resin containing pores, such as a foamed resin. Also, a configuration may be adopted wherein no trench 28 is provided. However, the physical size can be more reduced in the horizontal direction when the trench 28 is provided.

Second Embodiment

In this embodiment, a description of the same portions as those of the grasp sensor 10 and robot hand drive control apparatus 50 shown in the heretofore described embodiment will be omitted. The first embodiment has shown an example wherein the grasp sensor 10 has only the vertical pressure detection elements 40 as a tactile sensor.

As opposed to this, this embodiment is characterized in that the grasp sensor 10 also includes shear force detection elements 72, as well as the vertical pressure detection elements 40, as a tactile sensor. Also, this embodiment is characterized in that the robot hand drive control apparatus 50 feedback controls the grasp condition of the robot hand 200 using a shear force detected by the shear force detection elements 72, as well as the heretofore described vertical pressure.

Figure 7:
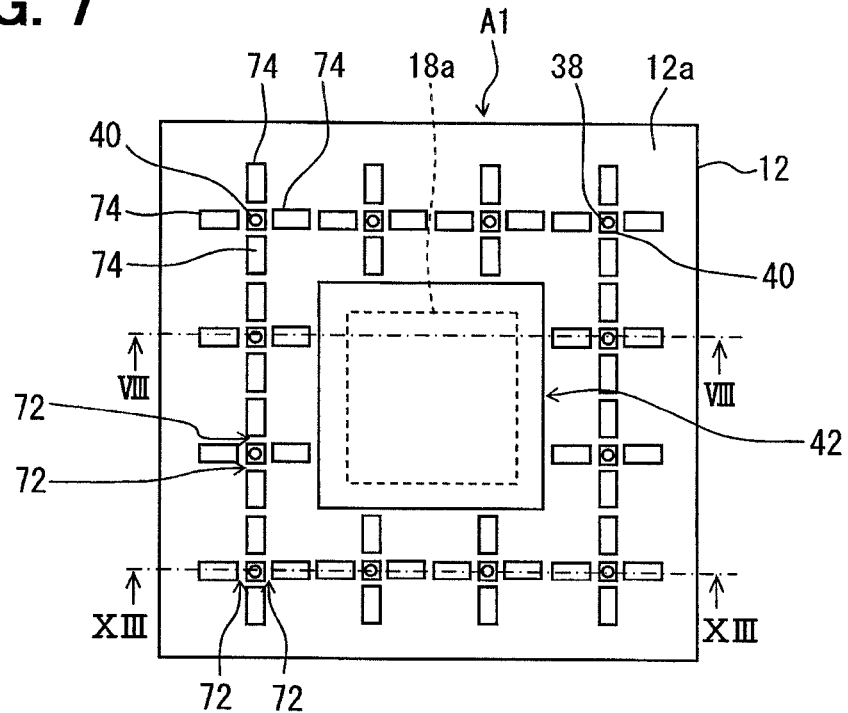
FIG. 7 is a plan view showing an outline configuration of a region A1 of a grasp sensor according to a second embodiment.
Figure 8:
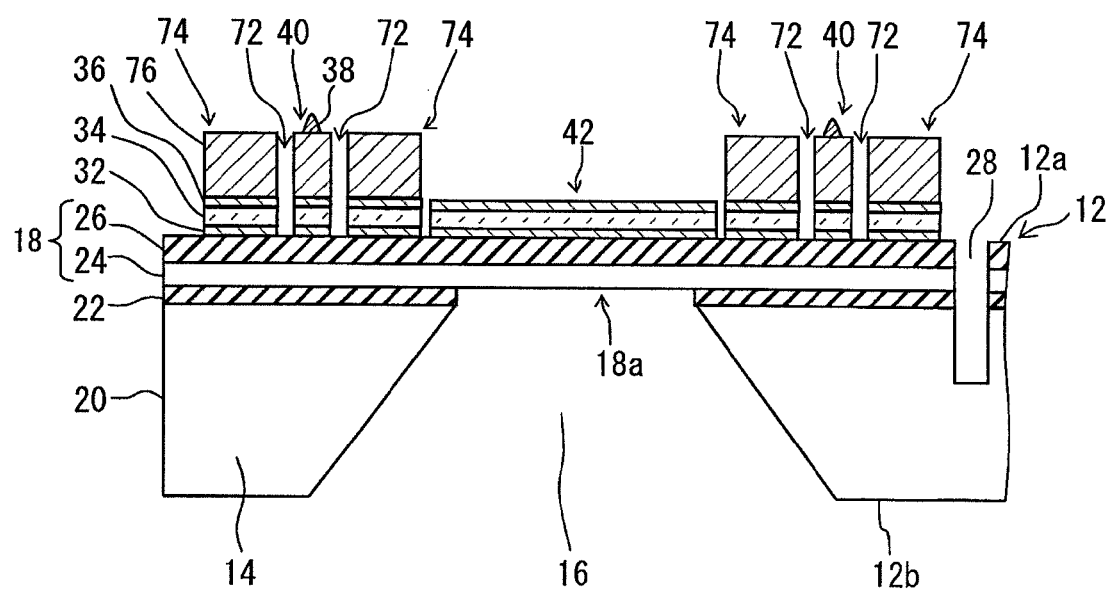
FIG. 8 is a sectional view along the line VIII-VIII of FIG. 7.

As shown in FIGS. 7 and 8, the grasp sensor 10 according to this embodiment includes an ultrasonic element 42 of the same form as in the first embodiment. FIG. 7 shows only the region A1 of the substrate 12, but the remaining regions A2 to A4 also have the same configuration as the region A1.

Also, in the same way as in the first embodiment, the vertical pressure detection elements 40 are provided above the thick portion 14 of the substrate 12 via the membrane 18. In this embodiment, as shown in FIG. 7, a plurality (12 in FIG. 7) of vertical pressure detection elements 40 are provided in a rectangular circular pattern while having predetermined pitches so as to surround the thin-walled portion 18a of a rectangular shape in plan view (the ultrasonic element 42 of a rectangular shape in plan view). The vertical pressure detection elements 40, being electrically separated from each other, can individually detect a vertical pressure.

Also, piezoelectric elements 74, apart from the vertical pressure detection elements 40 and ultrasonic element 42, are provided next to each of the vertical pressure detection elements 40 in the horizontal direction. Further, mutually adjacent vertical pressure detection element 40 and piezoelectric elements 74 configure the shear force detection element 72 for detecting a shear force applied in the horizontal direction (also referred to as a slip angle) as a change in capacitance value with at least the respective upper electrodes 36 of the mutually adjacent elements.

In this embodiment, the upper electrode 36 of each vertical pressure detection element 40 and thus the whole of the vertical pressure detection element 40 forms a rectangular shape (a substantially square shape) in the horizontal direction, and the piezoelectric elements 74 electrically separated from each other are disposed one on each side of the rectangle of the upper electrode 36 of the vertical pressure detection element 40. Further, the upper electrodes 36 of the piezoelectric elements 74 are disposed opposite to their respective four sides of the upper electrode 36 of each vertical pressure detection element 40.

Figure 9:
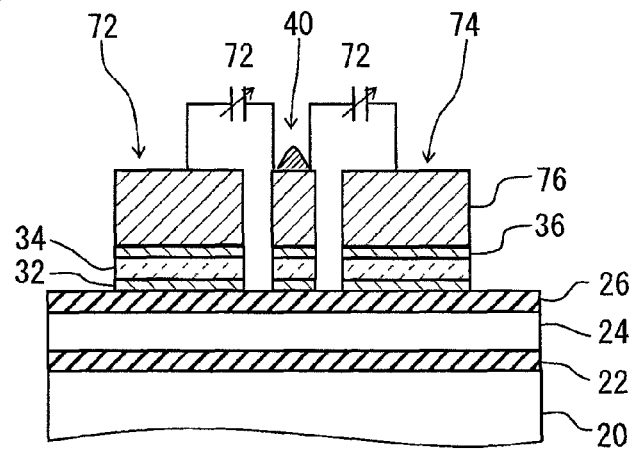
FIG. 9 is an enlarged sectional view of a periphery of shear force detection elements.

Also, pillar portions 76, forming a rectangular shape in the horizontal direction and having a predetermined height in the vertical direction, are formed on at least their respective upper electrodes 36 of the vertical pressure detection element 40 and piezoelectric elements 74, of the piezoelectric elements 30, which configure the shear force detection elements 72. In this embodiment, no pillar portion 76 is provided on the ultrasonic element 42, and the pillar portions 76 are provided only on the vertical pressure detection elements 40 and piezoelectric elements 74. The pillar portions 76 are electrically connected to the corresponding upper electrodes 36, and the pillar portions 76 of the piezoelectric elements 74 electrically separated from each other are disposed opposite to their respective four sides of the pillar portion 76 of each vertical pressure detection element 40. Further, as shown in FIG. 9, a capacitor electrode configuring each shear force detection element 72 is configured of the upper electrode 36 and pillar portion 76 of the vertical pressure detection element 40 and the upper electrode 36 and pillar portion 76 of the piezoelectric element 74. In the vertical pressure detection element 40, the projecting portion 38 is formed on the upper electrode 36 via the pillar portion 76.

In this embodiment, four piezoelectric elements 74 are provided for one vertical pressure detection element 40. Four piezoelectric elements 74 corresponding to one vertical pressure detection element 40 are electrically separated from each other, and the piezoelectric elements 74 corresponding to another vertical pressure detection element 40 are also electrically separated from each other. In this way, four shear force detection elements 72 are formed for one vertical pressure detection element 40. Each piezoelectric element 74, forming a rectangular shape in plan view, as shown in FIG. 7, is such that the width in the short direction is substantially equal to the width of the vertical pressure detection element 40, and the width in the long direction is larger than the width of the vertical pressure detection element 40. Because of this, the pillar portion 76 of the vertical pressure detection element 40 is smaller in sectional area in the horizontal direction than the pillar portion 76 of the piezoelectric element 74.

Directions parallel to their respective two perpendicular sides of the rectangular pillar portion 76 and directions parallel to their respective two perpendicular sides of the rectangular upper electrode 36 coincide with each other. As a constituent material of the pillar portion 76, it is possible to use a material electrically connected to the upper electrode 36, that is, any material which can form the capacitor electrodes of the shear force detection elements 72, to be described hereafter. There is, for example, a conductive resin such as polyacetylene or polythiophene, doped polysilicon, or a copper alloy. It is preferable that the pillar portion 76 is formed using a material lower in Young's modulus than that of the upper electrode 36 so as to deform easily in the horizontal direction.

Next, a description will be given, using FIG. 10, of a configuration of the robot hand drive control apparatus 50 according to this embodiment.

Figure 10:
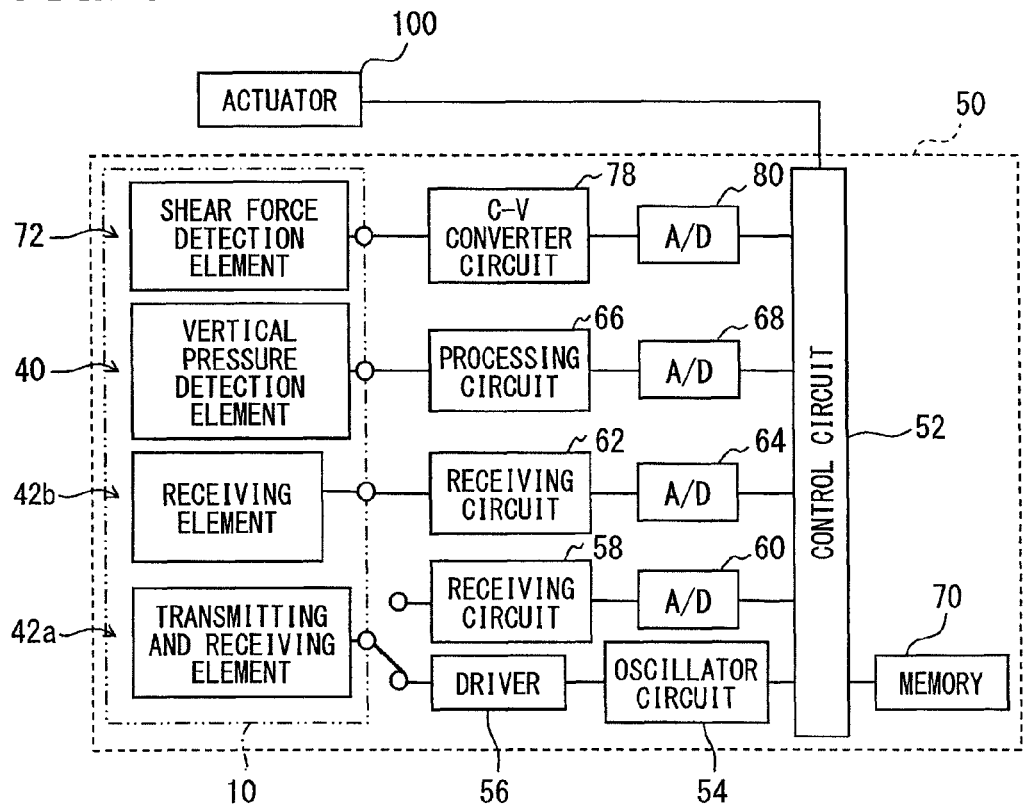
FIG. 10 is a block diagram showing an outline configuration of a robot hand drive control apparatus including the grasp sensor shown in FIG. 7.

As shown in FIG. 10, the robot hand drive control apparatus 50, unlike the robot hand drive control apparatus 50 shown in the first embodiment, is such that the grasp sensor 10 also has the shear force detection element 72. Further, the robot hand drive control apparatus 50 further includes a C-V converter circuit 78 which converts a capacitance value detected by the shear force detection element 72 into a voltage signal and an A/D converter circuit 80. With regard to the C-V converter circuit 78, as it is possible to employ a C-V converter circuit of a well-known configuration, a detailed description will be omitted.

Figure 11:
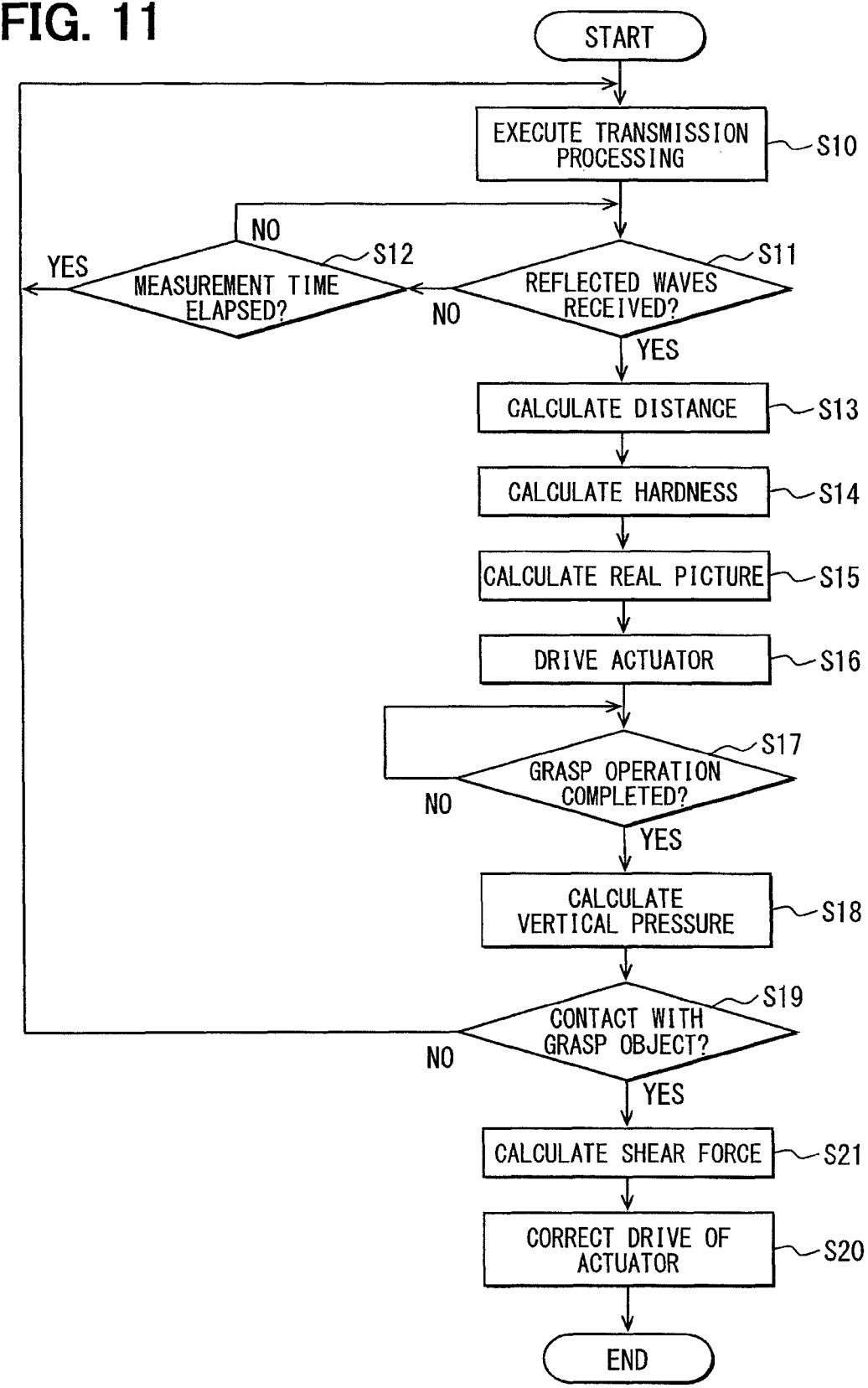
FIG. 11 is a flowchart showing a procedure of grasping a grasp object with a robot hand.

Next, a description will be given, using FIG. 11, of an operation, wherein the robot hand 200 grips the grasp object, which the control circuit 52 executes in accordance with a predetermined program.

Figure 4:
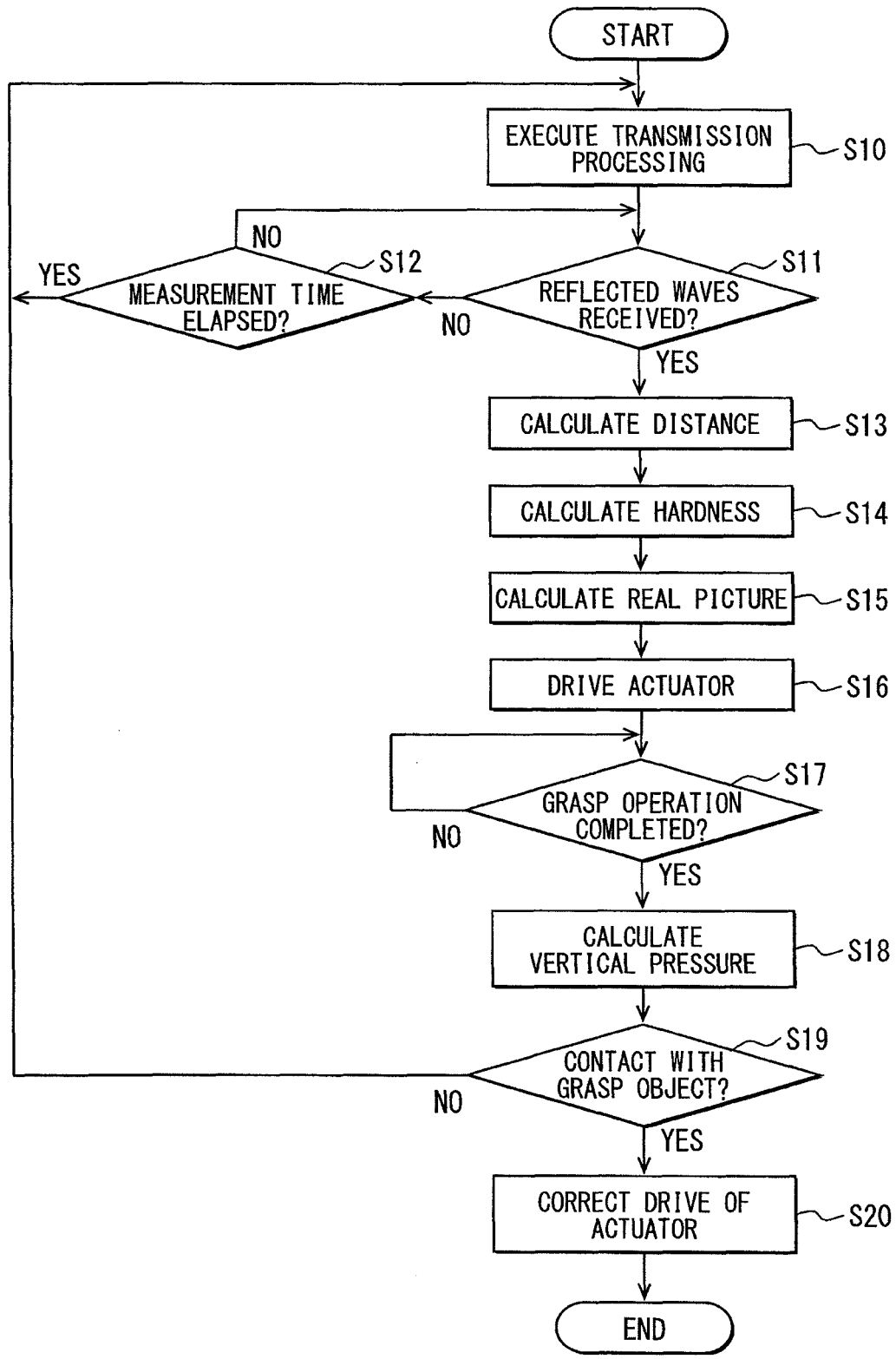
FIG. 4 is a flowchart showing a procedure of grasping a grasp object with a robot hand.

Steps S10 to S19 are the same as in FIG. 4 shown in the first embodiment. When it is determined in the step S19 that there is a contact, the control circuit 52 calculates a shear force applied in the horizontal direction based on the capacitance value detected by the shear force detection element 72 (step S21). The step S21 corresponds to shear force calculation device according to the claims.

Further, the control circuit 52, using the vertical pressure calculated in the step S18 and the shear force calculated in the step S21, feedback controls the grasp condition of the grasp object grasped by the robot hand 200 (step S20). The step S20 corresponds to grasp correction device according to the claims. For example, when the vertical pressure calculated in the step S18 is different from the recommended vertical pressure stored in the memory 70, the control circuit 52 feedback controls the actuator 100 so that the vertical pressure reaches the recommended vertical pressure, in the same way as in the first embodiment. That is, the control circuit 52 adjusts the grasp force of the robot hand 200 which has gripped the grasp object. Also, as there is fear that the robot hand 200 drops the grasp object when the shear force calculated in the step S19 is less than a predetermined threshold value, the control circuit 52 feedback controls the actuator 100 in a direction in which the vertical pressure increases. For example, the threshold value of the shear force is also stored in the memory 70.

Next, a description will be given of advantageous effects of characteristic portions of the grasp sensor 10 and robot hand drive control apparatus 50 according to this embodiment.

In this embodiment, the capacitance type shear force detection elements 72 are configured utilizing the vertical pressure detection element 40. Consequently, it is possible to simplify the configuration of the grasp sensor 10 as compared with the configuration wherein the shear force detection elements 72 are provided without utilizing the vertical pressure detection element 40. Because of this, for example, it is possible to reduce the physical size in the horizontal direction.

Also, in this embodiment, four piezoelectric elements 74 are disposed opposite to one vertical pressure detection element 40. Also, the capacitor electrode (the upper electrode 36 and pillar portion 76) of the vertical pressure detection element 40 forms a rectangular shape in plan view, and the capacitor electrodes (the upper electrodes 36 and pillar portions 76) of the piezoelectric elements 74 electrically separated from each other are disposed opposite to their respective four sides of the rectangle of the capacitor electrode of the vertical pressure detection element 40. Consequently, it is possible to detect shear forces in two axes (in a left-right direction and up-down direction on the plane shown in FIG.

7) in the horizontal direction. That is, it is possible to detect three axial forces combined with the vertical pressure.

In particular, in this embodiment, the pillar portions 76 are formed on the upper electrodes 36 of the vertical pressure detection element 40 and piezoelectric elements 74 configuring the shear force detection elements 72, as heretofore described. Because of this, it is possible to increase the area in which the capacitor electrodes are opposed to each other, and increase an initial capacitance value, as compared with a configuration wherein the capacitor electrodes configuring the shear force detection elements 72 are formed of only the upper electrodes 36. Also, by providing the pillar portions 76, the length of the capacitor electrodes in the vertical direction increases, and it is easy for the capacitor electrodes to deform, meaning that it is possible to increase the amount of change in the distance between opposed capacitor electrodes.

Furthermore, in this embodiment, the pillar portion 76 of the vertical pressure detection element 40 is made smaller in sectional area in the horizontal direction than the pillar portions 76 of the piezoelectric elements 74. By so doing, as it is easy for the pillar portion 76 of the vertical pressure detection element 40 to deform, it is possible to improve the sensitivity for detecting shear forces in two axes in the horizontal direction. When the pillar portions 76 are formed using a material lower in Young's modulus than that of the upper electrodes 36, it is possible to easily deform the capacitor electrodes as compared with a configuration wherein the capacitor electrodes of the same height are formed of only the upper electrodes 36.

Also, in this embodiment, the grasp sensor 10 has the shear force detection elements 72, and the robot hand drive control apparatus 50 includes the shear force calculation device (step S21) which calculates a shear force from a detection signal of the shear force detection elements 72. Because of this, it is possible, after the robot hand 200 has gripped the grasp object, to correct the grasp condition of the grasp object grasped by the robot hand 200, with better accuracy, based on the vertical pressure and shear forces.

Modification Example

The heretofore described embodiment has shown an example wherein the vertical pressure detection element 40 and piezoelectric elements 74 configuring the shear force detection elements 72 have their respective upper electrodes 36 and pillar portions 76 as the components of the capacitor electrodes. However, the capacitor electrodes may be configured of only the upper electrodes 36 without having any pillar portions 76.

In this embodiment too, the disposition of the piezoelectric elements 30 in the grasp sensor 10 (the disposition of the vertical pressure detection elements 40, ultrasonic elements 42, shear force detection elements 72, and piezoelectric elements 74) is not limited to the heretofore described example. The grasp sensor 10 has only to have at least one vertical pressure detection element 40, at least one ultrasonic element 42, and at least one shear force detection element 72 utilizing the vertical pressure detection element 40. In the heretofore described embodiment, the shear force detection elements 72 are configured of the vertical pressure detection element 40 and piezoelectric elements 74, but the shear force detection element 72 may be configured of the vertical pressure detection element 40 and ultrasonic element 42 without providing the piezoelectric elements 74.

Figure 12:
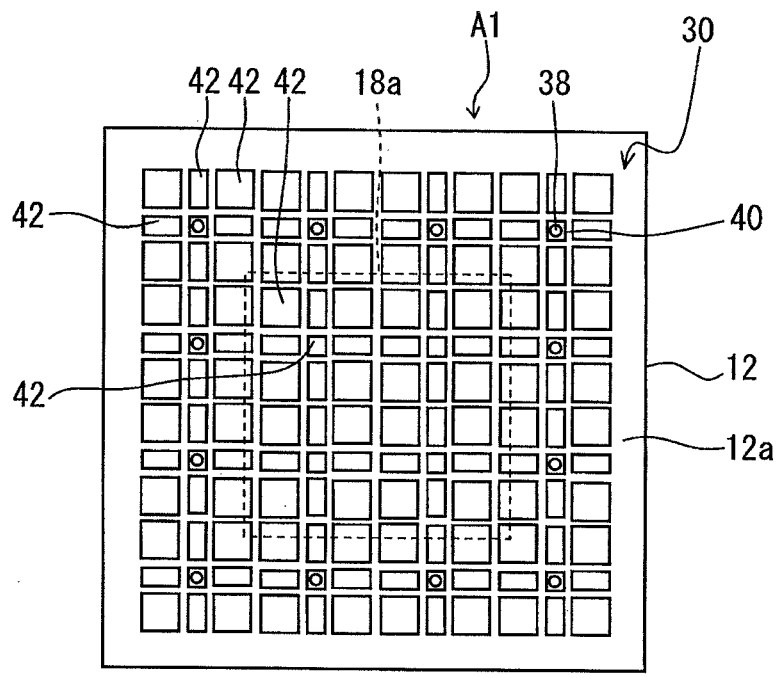
FIG. 12 is a plan view showing a modification example of the grasp sensor.

For example, in the example shown in FIG. 12, the piezoelectric elements 30 are provided in a matrix pattern (in rows and columns) substantially all over the one surface 12a of the substrate 12 in the region A1. Specifically, the piezoelectric elements 30 are disposed in 12 rows by 12 columns. Particularly, the cross-shaped disposition wherein the piezoelectric elements 74 are disposed, opposite to their respective four sides of the vertical pressure detection element 40, around the vertical pressure detection element 40 in the configuration shown in FIG. 7, is repeatedly structured not only on the thick portion 14 but also on the thin-walled portion 18a of the membrane 18. Further, the piezoelectric elements 30 provided on the thick portion 14 except the vertical pressure detection elements 40 are made the ultrasonic elements 42. These plurality of ultrasonic elements 42 are controlled in the robot hand drive control apparatus 50 so that the lower electrodes 32 are equal in potential to each other and the upper electrodes 36 are equal in potential to each other when transmitting ultrasonic (step S10) or when receiving ultrasonic (step S11). That is, the ultrasonic elements 42, although being structurally divided, electrically behave as one ultrasonic element 42. Meanwhile, only ultrasonic elements 42, of the ultrasonic elements 42, adjacent to each vertical pressure detection element 40 in two axes (in a left-right direction and up-down direction on the plane of FIG. 12) in the horizontal direction are controlled in the robot hand drive control apparatus 50, when calculating a shear force (step S21), so that the capacitor electrodes (upper electrodes 36 and pillar portions 76) of the only ultrasonic elements 42 are used for detecting the shear force. The same configuration is also adopted in the other regions A2 to A4. The configuration shown in FIG. 12 can be applied to the configuration wherein the substrate 12 has only one cavity 18, as in FIG. 5.

The heretofore described embodiment has shown an example wherein the vertical pressure detection elements 40 are formed on the thick portion 14 of the substrate 12, but it is also possible to adopt a configuration wherein the vertical pressure detection elements 40 are formed on the thin-walled portion 18a of the membrane 18. However, as the thin-walled portion 18a is provided so as to be deformable, it is conceivable that there is variation in vertical pressure from detection to detection, damage to the thin-walled portion 18a, or the like. Consequently, it is preferable to provide the vertical pressure detection elements 40 on the thick portion 14, as shown in the heretofore described embodiment.

Figure 13:
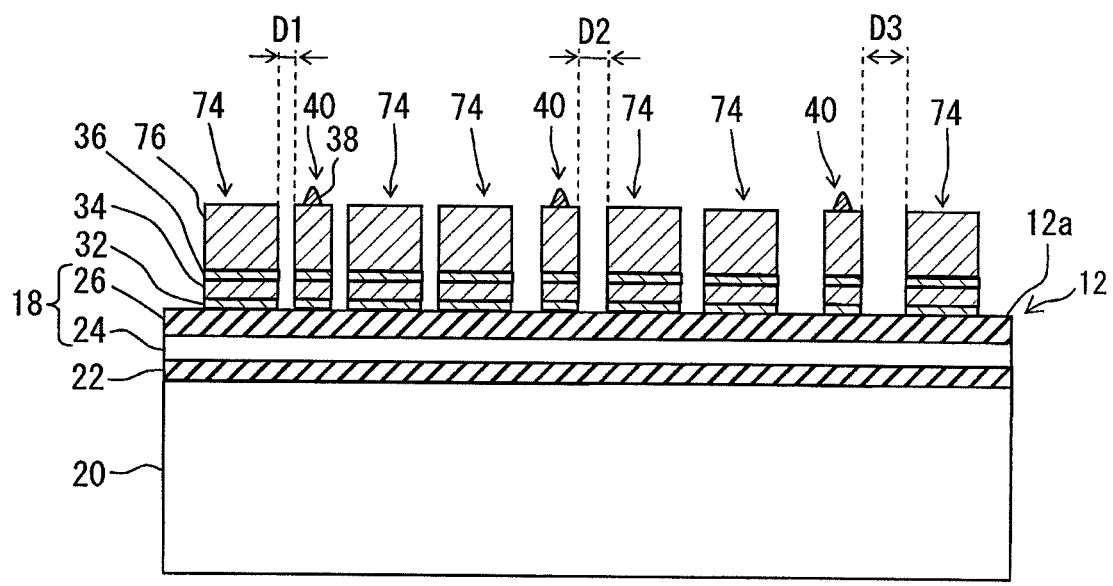
FIG. 13 is a sectional view showing another modification example of the grasp sensor, and the sectional view corresponds to the line XIII-XIII of FIG. 7.

The heretofore described embodiment has shown a capacitance type example as the shear force detection element 72. However, for example, as shown in FIG. 13, it is also possible to employ a shear force detection element wherein a plurality of contact type switches are provided so that contact timings are shifted from each other. FIG. 13 is a sectional view along the line of FIG. 7, and the sectional structure thereof is the same as FIG. 7 (the second embodiment) except that the distance between one vertical pressure detection element 40 and piezoelectric elements adjacent to the one vertical pressure detection element 40 is not the same as the distance between another vertical pressure detection element 40 and piezoelectric elements adjacent to the other vertical pressure detection element 40. The sectional view shown in FIG. 13 shows three vertical pressure detection elements 40, the distances between the vertical pressure detection elements 40 and their respective piezoelectric elements 74 are D1, D2 (>D1), and D3 (>D2) from the left side on the plane. Because of this, when a shear force is small, for example, only the pillar portion 76 of the vertical pressure detection element 40 of the distance D1 makes contact with the pillar portions 76 of the adjacent piezoelectric elements 74. That is, the vertical pressure detection element 40 is electrically connected to (shorts with) the upper electrodes 36 of the piezoelectric elements 74. Also, when a shear force is middle, the pillar portions 76 of the vertical pressure detection elements 40 of the distances D1 and D2 make contact with the pillar portions 76 of the adjacent piezoelectric elements 74. Also, when a shear force is large, the pillar portions 76 of the vertical pressure detection elements 40 of the distances D1, D2, and D3 make contact with the pillar portions 76 of the adjacent piezoelectric elements 74. Consequently, it is possible to calculate of which degree a shear force is, depending on how many of the vertical pressure detection elements 40 of the three distances has shorted with the adjacent piezoelectric elements 74. For example, a map showing the correspondence relationship between the distances and shear forces is stored in the memory 70, and the control circuit 52 calculates a shear force based on the map.

That is, a configuration may be adopted wherein the grasp sensor 10 has a plurality of vertical pressure detection elements 40 as the piezoelectric elements 30, other piezoelectric elements 74 (which may be the ultrasonic elements 42) are provided next to each vertical pressure detection element 40, and the plurality of vertical pressure detection elements 40 are dispersed in the horizontal direction, wherein each vertical pressure detection element 40 and the other piezoelectric elements 74 adjacent thereto are such that the pillar portions 76 electrically connected to the upper electrodes 36 are formed on the upper electrodes 36, and each vertical pressure detection element 40 is such that the projecting portion 38 is formed on the upper electrode 36 via the pillar portion 76, and wherein the distance between the pillar portion 76 of each vertical pressure detection element 40 and the pillar portions 76 of the other piezoelectric elements 74 adjacent to the each vertical pressure detection element 40 is set to multiple stages (the distances D1 to D3) in at least one axial direction in the horizontal direction.

The heretofore described disclosure has the following aspects.

In a first aspect of the present disclosure, a complex device includes: a substrate having a thick portion, a cavity surrounded by the thick portion and a membrane arranged over the thick portion so as to bridge the cavity; and a plurality of piezoelectric elements, each of which is formed by stacking a lower electrode, a piezoelectric film and an upper electrode in this order on one surface of the membrane opposite to the thick portion. The piezoelectric elements are electrically separated from each other. A part of the piezoelectric elements has a projecting portion made of an electrical insulating material. The projecting portion is arranged on the upper electrode. The part of piezoelectric elements provides a vertical pressure detection element for detecting a vertical pressure applied in a vertical direction, in which the piezoelectric elements are stacked. The piezoelectric elements further have an ultrasonic element, which implements at least one of ultrasonic transmission or ultrasonic reception. The ultrasonic element is one of the piezoelectric elements other than the vertical pressure detection element. The ultrasonic element is arranged over at least the cavity of the substrate in a horizontal direction perpendicular to the vertical direction.

In the heretofore described complex device, a plurality of piezoelectric elements are formed on the membrane, and a part of the piezoelectric elements is caused to function as the vertical pressure detection element, while at least a part of the piezoelectric elements other than the vertical pressure detection element is caused to function as the ultrasonic element. Consequently, while the ultrasonic element acting as a distance sensor and the vertical pressure detection element acting as a tactile sensor are included as the grasp sensor, it is possible to reduce the number of parts. Also, by reducing the number of parts, it is possible to reduce the physical size and reduce manufacturing costs.

As an alternative, the complex device may be a grasp sensor used for grasping a grasp object.

As an alternative, the vertical pressure detection element may be arranged on the thick portion of the substrate in the horizontal direction. In this case, as a portion in which the thick portion is formed in the horizontal direction is higher in rigidity than the other portion of the substrate, for example, a portion of the membrane on the cavity, it is possible to detect a vertical pressure with good accuracy.

As an alternative, the one of the piezoelectric elements may be arranged adjacent to the vertical pressure detection element in the horizontal direction. The vertical pressure detection element and the one of piezoelectric elements adjacent to each other provide a shear force detection element. The shear force detection element detects a shear force applied in the horizontal direction as a change in a capacitance value using at least the upper electrode. According to this, capacitance type shear force detection elements are configured utilizing the vertical pressure detection element. Consequently, it is possible to simplify the configuration as compared with a configuration wherein shear force detection elements are provided without utilizing the vertical pressure detection element. Because of this, for example, it is possible to reduce the physical size in the horizontal direction.

As an alternative, the upper electrode of the vertical pressure detection element may have a rectangular shape in the horizontal direction. The upper electrode of the one of the piezoelectric elements is disposed opposed to each side of the rectangular shape of the upper electrode of the vertical pressure detection element. The upper electrodes of the one of the piezoelectric elements disposed opposed to the upper electrode of the vertical pressure detection element are electrically separated from each other. According to this, it is possible to detect shear forces in two axes in the horizontal direction. That is, it is possible to detect three axial forces combined with the vertical pressure.

As an alternative, the complex device may further include: a plurality of pillar portions respectively arranged on at least the upper electrodes of the vertical pressure detection element and the one of piezoelectric elements, which provide the shear force detection element, electrically connected to the upper electrodes of the vertical pressure detection element and the one of piezoelectric elements, and having a rectangular shape in the horizontal direction. One of the pillar portions of the one of the piezoelectric elements is disposed opposed to each side of the rectangular shape of the pillar portion of the vertical pressure detection element. The shear force detection element is provided by the upper electrode and the pillar portion. The projecting portion of the vertical pressure detection element is arranged on the upper electrode via the pillar portion. According to this, one set of capacitor electrodes configuring the shear force detection elements is configured of the upper electrodes and pillar portions. Consequently, it is possible to increase the area in which the capacitor electrodes are opposed to each other, and increase an initial capacitance value, as compared with a configuration wherein the shear force detection elements are formed of only the upper electrodes. Also, as it is easy for the capacitor electrodes to deform, it is possible to increase the amount of change in the distance at which the capacitor electrodes are opposed to each other.

As an alternative, the pillar portion of the vertical pressure detection element may have a cross sectional area in the horizontal direction smaller than the pillar portion of the one of the piezoelectric elements adjacent to the vertical pressure detection element. According to this, as it is easy for the pillar portion of the vertical pressure detection element to deform, it is possible to improve the sensitivity for detecting shear forces in two axes in the horizontal direction.

As an alternative, the pillar portion may be made of a material having a Young's modulus smaller than the upper electrode. According to this, it is possible to easily deform the capacitor electrodes as compared with a configuration wherein the capacitor electrodes of the same height are formed of only the upper electrodes.

As an alternative, the cavity may include a plurality of cavity portions. The ultrasonic element includes a plurality of ultrasonic element portions. Each ultrasonic element portion is disposed over a corresponding cavity portion. The plurality of ultrasonic element portions are electrically separated from each other. The plurality of ultrasonic element portions have at least one ultrasonic transmission element for transmitting an ultrasonic wave and a plurality of ultrasonic reception elements for receiving the ultrasonic wave. According to this, as at least one transmitting ultrasonic element and a plurality of receiving ultrasonic elements are integrated on one substrate, it is possible to ascertain the real picture (the size and position) of the grasp object from an output of the one substrate, that is, of one grasp sensor.

As an alternative, the vertical pressure detection element may have a plurality of vertical pressure detection element portions. The plurality of vertical pressure detection element portions are arranged to be dispersed in the horizontal direction. According to this, it is possible to detect a vertical pressure, and the like, regardless of the shape and size of the grasp object.

In a second aspect of the present disclosure, a robot hand drive control apparatus includes: the complex device according to the first aspect of the present disclosure having the ultrasonic transmission element and the plurality of ultrasonic reception elements; a distance calculation device, which calculates a distance to a grasp object to be grasped by a robot hand based on time information defined from transmission of the ultrasonic wave by the ultrasonic transmission element to reception of a reflected wave of the ultrasonic wave by the ultrasonic reception elements; a hardness calculation device, which calculates a hardness of the grasp object based on the time information and amplitude information indicating an amplitude of the reflected waves received by the ultrasonic elements; a real picture calculation device, which calculates a position and a size of the grasp object based on phase difference information indicating a phase difference between the reflected waves received by the plurality of ultrasonic elements; a grasp control device, which controls a drive of the robot hand for grasping the grasp object according to the distance calculated in the distance calculation device, the hardness calculated in the hardness calculation device, and the position and the size calculated in the real picture calculation device; a vertical pressure calculation device, which calculates a vertical pressure at time when the drive control by the grasp control device is completed, based on a detection signal of the vertical pressure detection element; and a grasp correction device, which feedback-controls a grasp condition of the grasp object grasped by the robot hand according to the vertical pressure calculated in the vertical pressure calculation device.

In the heretofore described robot hand drive control apparatus, it is possible to calculate not only the distance to the grasp object but also the hardness of the grasp object. Because of this, it is possible to grip the grasp object at a pressure and speed in accordance with the calculated hardness. Also, as it is also possible to calculate the position and size of the grasp object, it is possible to grip the grasp object with good accuracy. Also, it is possible to calculate a vertical pressure, and based on the calculated vertical pressure, correct (feedback control) the grasp condition of the grasp object grasped by the robot hand.

In a third aspect of the present disclosure, a robot hand drive control apparatus includes: the complex device according to the first aspect of the present disclosure having the ultrasonic transmission element and the plurality of ultrasonic reception elements, wherein the one of the piezoelectric element is arranged adjacent to the vertical pressure detection element in the horizontal direction, the vertical pressure detection element and the one of the piezoelectric elements adjacent to each other provide the shear force detection element, and the shear force detection element detects a shear force applied in the horizontal direction as a change in capacitance value using at least the upper electrode; a distance calculation device, which calculates a distance to a grasp object grasped by a robot hand based on time information defined from transmission of the ultrasonic wave by the ultrasonic transmission element to reception of a reflected wave of the ultrasonic wave by the ultrasonic reception element; a hardness calculation device, which calculates a hardness of the grasp object based on the time information and amplitude information indicating an amplitude of the reflected waves received by the ultrasonic reception elements; a real picture calculation device, which calculates a position and a size of the grasp object based on phase difference information indicating a phase difference between the reflected waves received by the plurality of ultrasonic reception elements; a grasp control device, which controls a drive of the robot hand for grasping the grasp object according to the distance calculated in the distance calculation device, the hardness calculated in the hardness calculation device, and the position and the size calculated in the real picture calculation device; a vertical pressure calculation device, which calculates a vertical pressure at time when the drive control by the grasp control device is completed, based on a detection signal of the vertical pressure detection element; a shear force calculation device, which calculates a shear force applied in the horizontal direction at time when the drive control by the grasp control device is completed, based on a capacitance value detected by the shear force detection element; and a grasp correction device, which feedback-controls a grasp condition of the grasp object grasped by the robot hand according to the vertical pressure calculated in the vertical pressure calculation device and the shear force calculated in the shear force calculation device.

In the heretofore described robot hand drive control apparatus, it is possible to calculate not only the distance to the grasp object but also the hardness of the grasp object. Because of this, it is possible to grip the grasp object at a pressure and speed in accordance with the calculated hardness. Also, as it is also possible to calculate the position and size of the grasp object, it is possible to grip the grasp object with good accuracy. Also, it is possible to calculate a vertical pressure, and based on the calculated vertical pressure, correct (feedback control) the grasp condition of the grasp object grasped by the robot hand. Furthermore, it is possible to calculate a shear force. Because of this, it is possible, based on the heretofore described vertical pressure and shear force, to correct (feedback control) the grasp condition of the grasp object by the robot hand with better accuracy.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A complex device comprising:
a substrate having a thick portion, a cavity surrounded by the thick portion and a membrane arranged over the thick portion so as to bridge the cavity; and
a plurality of piezoelectric elements, each of which is formed by stacking a lower electrode, a piezoelectric film and an upper electrode in this order on one surface of the membrane opposite to the thick portion, wherein:
the piezoelectric elements are electrically separated from each other; a part of the piezoelectric elements has a projecting portion made of an electrical insulating material;
the projecting portion is arranged on the upper electrode;
the part of piezoelectric elements provides a vertical pressure detection element for detecting a vertical pressure applied in a vertical direction, in which the piezoelectric elements are stacked;
the piezoelectric elements further have an ultrasonic element, which implements at least one of ultrasonic transmission or ultrasonic reception;
the ultrasonic element is one of the piezoelectric elements other than the vertical pressure detection element; and
the ultrasonic element is arranged over at least the cavity of the substrate in a horizontal direction perpendicular to the vertical direction.

2. The complex device according to claim 1, wherein:
the complex device is a grasp sensor used for grasping a grasp object.

3. The complex device according to claim 1, wherein:
the vertical pressure detection element is arranged on the thick portion of the substrate in the horizontal direction.

4. The complex device according to claim 1, wherein:
the one of the piezoelectric elements is arranged adjacent to the vertical pressure detection element in the horizontal direction;
the vertical pressure detection element and the one of piezoelectric elements adjacent to each other provide a shear force detection element; and
the shear force detection element detects a shear force applied in the horizontal direction as a change in a capacitance value using at least the upper electrode.

5. The complex device according to claim 4, wherein:
the upper electrode of the vertical pressure detection element has a rectangular shape in the horizontal direction;
the upper electrode of the one of the piezoelectric elements is disposed opposed to each side of the rectangular shape of the upper electrode of the vertical pressure detection element; and
the upper electrodes of the one of the piezoelectric elements disposed opposed to the upper electrode of the vertical pressure detection element are electrically separated from each other.

6. The complex device according to claim 5, further comprising:
a plurality of pillar portions respectively arranged on at least the upper electrodes of the vertical pressure detection element and the one of piezoelectric elements, which provide the shear force detection element, electrically connected to the upper electrodes of the vertical pressure detection element and the one of piezoelectric elements, and having a rectangular shape in the horizontal direction, wherein:
one of the pillar portions of the one of the piezoelectric elements is disposed opposed to each side of the rectangular shape of the pillar portion of the vertical pressure detection element;
the shear force detection element is provided by the upper electrode and the pillar portion; and
the projecting portion of the vertical pressure detection element is arranged on the upper electrode via the pillar portion.

7. The complex device according to claim 6, wherein:
the pillar portion of the vertical pressure detection element has a cross sectional area in the horizontal direction smaller than the pillar portion of the one of the piezoelectric elements adjacent to the vertical pressure detection element.

8. The complex device according to claim 6, wherein:
the pillar portion is made of a material having a Young's modulus smaller than the upper electrode.

9. The complex device according to claim 1, wherein:
the cavity includes a plurality of cavity portions;
the ultrasonic element includes a plurality of ultrasonic element portions;
each ultrasonic element portion is disposed over a corresponding cavity portion;
the plurality of ultrasonic element portions are electrically separated from each other; and
the plurality of ultrasonic element portions have at least one ultrasonic transmission element for transmitting an ultrasonic wave and a plurality of ultrasonic reception elements for receiving the ultrasonic wave.

10. A robot hand drive control apparatus comprising:
the complex device according to claim 9 having the ultrasonic transmission element and the plurality of ultrasonic reception elements;
a distance calculation device, which calculates a distance to a grasp object to be grasped by a robot hand based on time information defined from transmission of the ultrasonic wave by the ultrasonic transmission element to reception of a reflected wave of the ultrasonic wave by the ultrasonic reception elements;
a hardness calculation device, which calculates a hardness of the grasp object based on the time information and amplitude information indicating an amplitude of the reflected waves received by the ultrasonic elements;
a real picture calculation device, which calculates a position and a size of the grasp object based on phase difference information indicating a phase difference between the reflected waves received by the plurality of ultrasonic elements;
a grasp control device, which controls a drive of the robot hand for grasping the grasp object according to the distance calculated in the distance calculation device, the hardness calculated in the hardness calculation device, and the position and the size calculated in the real picture calculation device;
a vertical pressure calculation device, which calculates a vertical pressure at time when the drive control by the grasp control device is completed, based on a detection signal of the vertical pressure detection element; and
a grasp correction device, which feedback-controls a grasp condition of the grasp object grasped by the robot hand according to the vertical pressure calculated in the vertical pressure calculation device.

11. A robot hand drive control apparatus comprising:

the complex device according to claim 9 having the ultrasonic transmission element and the plurality of ultrasonic reception elements, wherein the one of the piezoelectric element is arranged adjacent to the vertical pressure detection element in the horizontal direction, the vertical pressure detection element and the one of the piezoelectric elements adjacent to each other provide the shear force detection element, and the shear force detection element detects a shear force applied in the horizontal direction as a change in capacitance value using at least the upper electrode;

a distance calculation device, which calculates a distance to a grasp object grasped by a robot hand based on time information defined from transmission of the ultrasonic wave by the ultrasonic transmission element to reception of a reflected wave of the ultrasonic wave by the ultrasonic reception element;

a hardness calculation device, which calculates a hardness of the grasp object based on the time information and amplitude information indicating an amplitude of the reflected waves received by the ultrasonic reception elements;

a real picture calculation device, which calculates a position and a size of the grasp object based on phase difference information indicating a phase difference between the reflected waves received by the plurality of ultrasonic reception elements;

a grasp control device, which controls a drive of the robot hand for grasping the grasp object according to the distance calculated in the distance calculation device, the hardness calculated in the hardness calculation device, and the position and the size calculated in the real picture calculation device;

a vertical pressure calculation device, which calculates a vertical pressure at time when the drive control by the grasp control device is completed, based on a detection signal of the vertical pressure detection element;

a shear force calculation device, which calculates a shear force applied in the horizontal direction at time when the drive control by the grasp control device is completed, based on a capacitance value detected by the shear force detection element; and a grasp correction device, which feedback-controls a grasp condition of the grasp object grasped by the robot hand according to the vertical pressure calculated in the vertical pressure calculation device and the shear force calculated in the shear force calculation device.

12. The complex device according to claim 1, wherein:
the vertical pressure detection element has a plurality of vertical pressure detection element portions; and
the plurality of vertical pressure detection element portions are arranged to be dispersed in the horizontal direction.

13. The complex device according to claim 1, wherein:
the projecting portion is a foremost portion of the piezoelectric elements.

14. The complex device according to claim 1, wherein:
the projecting portion includes an uncovered top.

15. The complex device according to claim 1, wherein:
the projecting portion extends beyond the ultrasonic element.

16. The complex device according to claim 1, wherein:
the piezoelectric elements protrude from the membrane and extend beyond the ultrasonic element via the protrusion portion.

17. The complex device according to claim 1, wherein:
the projecting portion is only formed on the piezoelectric elements.

* * * * *